US008658055B2

(12) United States Patent
Hsueh et al.

(10) Patent No.: US 8,658,055 B2
(45) Date of Patent: Feb. 25, 2014

(54) SOLID-STATE HYDROGEN FUEL WITH POLYMER MATRIX AND FABRICATION METHODS THEREOF

(75) Inventors: Chan-Li Hsueh, Qieding Township (TW); Jie-Ren Ku, Kaohsiung (TW); Shing-Fen Tsai, Xinshi Township (TW); Ya-Yi Hsu, Guiren Township (TW); Cheng-Yen Chen, Yongkang (TW); Reiko Ohara, Tainan (TW); Ming-Shan Jeng, Sijhih (TW); Fanghei Tsau, Niaosong Shiang (TW)

(73) Assignee: Industrial Technology Research Institute (TW)

( * ) Notice: Subject to any disclaimer, the term of this patent is extended or adjusted under 35 U.S.C. 154(b) by 82 days.

(21) Appl. No.: 12/476,894

(22) Filed: Jun. 2, 2009

(65) Prior Publication Data
US 2010/0230636 A1 Sep. 16, 2010

(30) Foreign Application Priority Data
Mar. 13, 2009 (TW) ................. 98108205 A

(51) Int. Cl.
*C01B 3/02* (2006.01)
*C01B 3/08* (2006.01)
*C01B 6/21* (2006.01)
*C09K 3/00* (2006.01)

(52) U.S. Cl.
USPC .............. 252/186.26; 252/188.25; 423/648.1; 423/657

(58) Field of Classification Search
USPC ........................... 252/188.25, 188.26
See application file for complete search history.

(56) References Cited

U.S. PATENT DOCUMENTS

| | | | | |
|---|---|---|---|---|
| 3,674,702 | A * | 7/1972 | MacKenzie et al. | 149/19.9 |
| 4,799,360 | A * | 1/1989 | Retallick et al. | 62/46.1 |
| 6,645,651 | B2 | 11/2003 | Hockaday et al. | |
| 6,773,692 | B2 | 8/2004 | Pecharsky et al. | |
| 7,309,479 | B2 * | 12/2007 | Lim et al. | 423/648.1 |
| 7,641,889 | B1 * | 1/2010 | Salinas et al. | 423/658.2 |
| 2002/0083643 | A1 * | 7/2002 | Amendola et al. | 48/61 |
| 2002/0182459 | A1 | 12/2002 | Hockaday et al. | |
| 2003/0228252 | A1 | 12/2003 | Shurtleff | |
| 2004/0071630 | A1 | 4/2004 | Jorgensen | |
| 2006/0237688 | A1 | 10/2006 | Zimmermann | |
| 2006/0257313 | A1 * | 11/2006 | Cisar et al. | 423/648.1 |
| 2007/0025908 | A1 * | 2/2007 | Sandrock et al. | 423/644 |
| 2007/0253875 | A1 | 11/2007 | Koripella et al. | |
| 2008/0299420 | A1 | 12/2008 | Kelley et al. | |
| 2008/0299423 | A1 | 12/2008 | LaVen | |
| 2009/0011294 | A1 | 1/2009 | Kong | |

FOREIGN PATENT DOCUMENTS

| | | |
|---|---|---|
| CN | 1565958 | 1/2005 |
| CN | 1681150 | 10/2005 |
| CN | 1845873 A | 10/2006 |
| CN | 1901261 | 1/2007 |
| CN | 101327907 | 12/2008 |
| CN | 101327909 | 12/2008 |
| EP | 2 048 110 | 4/2009 |
| JP | 2001200159 | 7/2001 |
| JP | 2002-522209 | 7/2002 |
| JP | 2006051473 | 2/2006 |
| JP | 2006213563 | 8/2006 |
| JP | 2008062128 | 3/2008 |
| JP | 2008538321 | 10/2008 |
| JP | 2010042933 | 2/2010 |
| TW | I229471 | 3/2005 |
| TW | 200806392 | 2/2008 |
| TW | 200927288 | 7/2009 |
| TW | 200929677 | 7/2009 |
| WO | WO 2005/005311 | 1/2005 |
| WO | WO 2008/132986 | 11/2008 |

OTHER PUBLICATIONS

Taiwan Office Action dated Sep. 27, 2011 from corresponding application No. 098108205.
Liu, Cheng-Hong, et al., "Prepration of Magnetic Cobalt-Based Catalyst for Hydrogen Generation from Alkaline NaBH4 Solution", Applied Catalysis B: Environmental 91 (2009) 368-379.
Hsueh, Chan-Li, et al., "Regenration of Spent-NaBH Back to NaBH by Using High-Energy Ball Milling", International Journal of Hydrogen Energy 34 (2009) 1717-1725.
Hsueh, Chan Li, et al., "Simple and Fast Fabrication of Polymer Template-Ru Composite as a Catalyst for Hydrogen Generation from Alkaline NaBH Solution", Journal of Power Sources 177 (2008) 485-492.
Office Action dated Jan. 20, 2012, from corresponding application No. EP 09 165 066.3-1270.
OA dated Apr. 2, 2012 from corresponding application No. TW 098112619.
OA dated May 29, 2012 from corresponding application No. JP 2009-283194.
OA dated Aug. 1, 2012 from corresponding application No. CN 200910130262.9.
European Search Report from corresponding application No. 10002724.2, (Jul. 2010).

* cited by examiner

*Primary Examiner* — Peter F Godenschwager
(74) *Attorney, Agent, or Firm* — Lowe Hauptman & Ham, LLP

(57) ABSTRACT

Solid-state hydrogen fuel with a polymer matrix and fabrication methods thereof are presented. The solid-state hydrogen fuel includes a polymer matrix, and a crushed mixture of a solid chemical hydride and a solid-state catalyst uniformly dispersed in the polymer matrix. The fabrication method for the solid-state hydrogen fuel includes crushing and mixing a solid chemical hydride and a solid-state catalyst in a crushing/mixing machine, and adding the polymer matrix into the mixture of the solid chemical hydride and the solid-state catalyst to process a flexible solid-state hydrogen fuel. Moreover, various geometric and/or other shapes may be formed and placed into suitable vessels to react with a particular liquid and provide a steady rate of hydrogen release.

19 Claims, 5 Drawing Sheets

SOLID-STATE HYDROGEN FUEL WITH POLYMER MATRIX AND FABRICATION METHODS THEREOF

CROSS REFERENCE TO RELATED APPLICATIONS

This application is based upon and claims the benefit of priority from a prior Taiwanese Patent Application No. 098108205, filed on Mar. 13, 2009, the entire contents of which are incorporated herein by reference.

BACKGROUND OF THE INVENTION

1. Field of the Invention

The invention relates to solid-state hydrogen fuels, and in particular to, solid-state hydrogen fuels with a polymer matrix and fabrication methods thereof.

2. Description of the Related Art

Flexible electronics adopt soft or bendable materials to achieve applications with lighter, thinner and infrangible characteristics. Applications of electronic products are therefore transformed from heavy solid-state objects into the whole regimes of light, thin, portable applications.

Conventional fuel cells provide hydrogen containing fuels and oxygen containing air on both sides of an electrolyte ion-exchange membrane. After oxidation and reduction, current loop is generated to provide power for component operation. Such fuel cells typically have a gigantic structure and are merely suitable for large scale apparatus applications, such as power plants, motor vehicles, cogeneration apparatuses, submarines, spacecrafts, etc.

However, for electricity demands for many portable electronic products, such as portable computers, cameras, portable music players and other digital devices, batteries which are cheap, last long, small-sized, light weighted and suitable for varieties of environmental conditions are needed. Although some conventional fuel cells are cheap and last long, their applications are however limited to conventional structures such that they cannot be widely applied to various kinds of products. Therefore, flexible fuel cell designs have been disclosed.

Taiwan Patent No. I229471 discloses flexible fuel cells. However, the flexible fuel cells are not applicable for flexible fuels having plasticity. It should be noted that the hydrogen fuel supply unit of the fuel cell mainly includes methanol fuel or other dissolvable hydrogen ion fuels.

Additionally, the hydrogen fuels utilized by flexible fuel cells having plasticity are also required to meet the cheap, long lasting, small-sized, light weight and environmental condition requirements of batteries.

BRIEF SUMMARY OF THE INVENTION

Embodiments of the invention provide a solid-state hydrogen fuel with a polymer matrix, comprising: a polymer matrix; and a crushed mixture of a solid-state chemical hydride and a solid-state catalyst uniformly dispersed in the polymer matrix.

Embodiments of the invention further provide a fabrication method for a solid-state hydrogen fuel with a polymer matrix, comprising: crushing and mixing a solid chemical hydride and a solid-state catalyst in a crushing/mixing machine; and adding the polymer matrix into the mixture of the solid chemical hydride and the solid-state catalyst to process a flexible solid-state hydrogen fuel. The fabrication method further comprises: forming various geometric and/or other shapes and placing the hydrogen fuel into a suitable vessel; and disposing a specific liquid in the suitable vessel to react with the specific liquid to provide a steady rate of hydrogen release.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
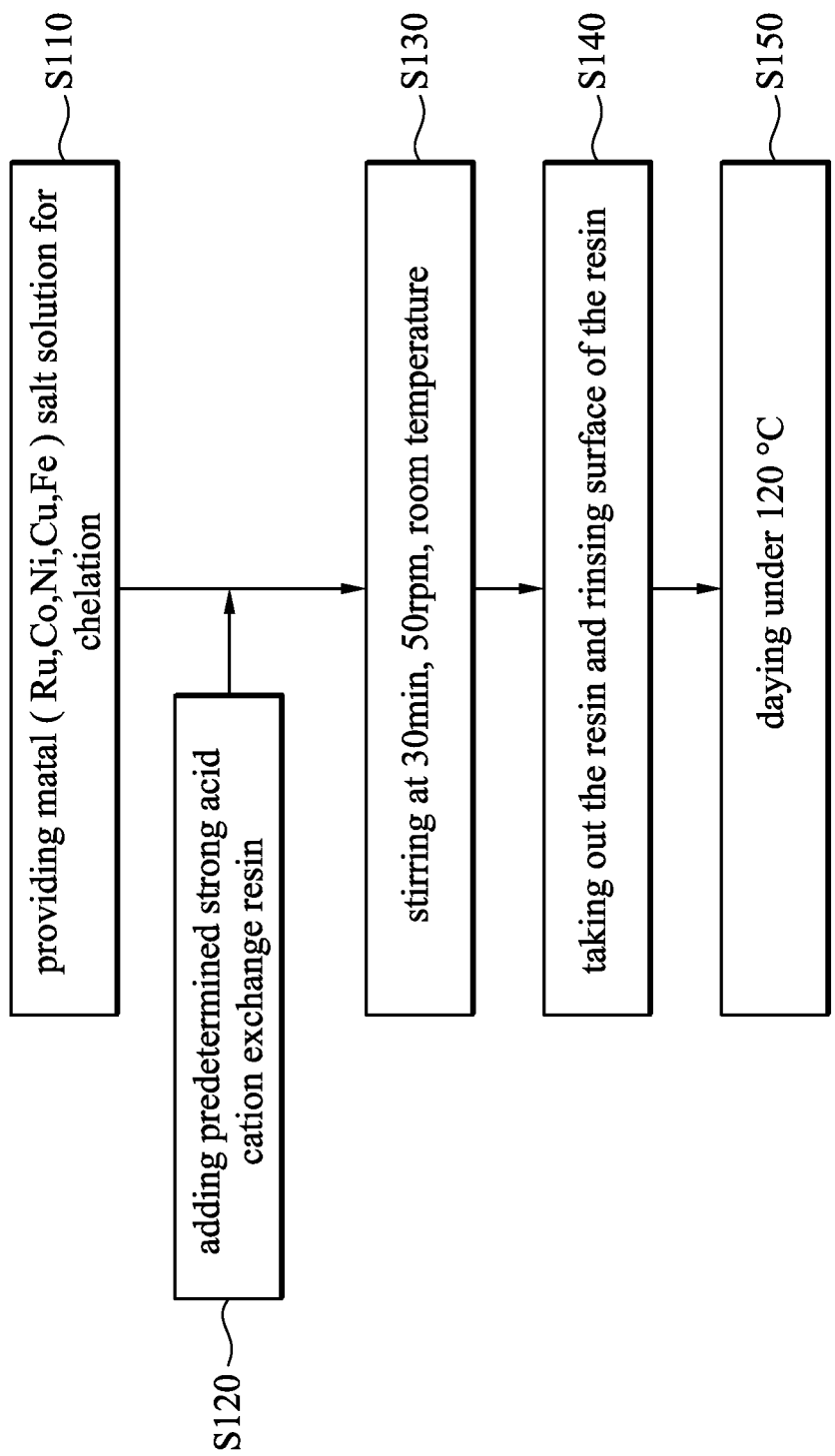
FIG. 1 is a fabrication flowchart of an embodiment of preparation method for a solid-state catalyst.

It is understood that the following disclosure provides many different embodiments, or examples, for implementing different features of various embodiments. Specific examples of components and arrangements are described below to simplify the present disclosure. These are merely examples and are not intended to be limited. In addition, the present disclosure may repeat reference numerals and/or letters in the various examples. This repetition is for the purpose of simplicity and clarity and does not in itself indicate a relationship between the various embodiments and/or configurations discussed. Moreover, the formation of a first feature over or on a second feature in the description that follows may include embodiments in which the first and second features are formed in direct contact or not in direct contact.

Accordingly, embodiments of the invention provide a plastic solid-state hydrogen fuel with a polymer matrix which can be formed into various geometric and/or other shapes and structures. The solid-state hydrogen fuel can be compatible with a variety of flexible fuel cells. The solid-state hydrogen fuel can also react with specific liquid, thereby providing a steady rate of hydrogen release. Furthermore, after the solid-state hydrogen fuel is depleted, consumers may choose to discard or to recycle the solid-state hydrogen fuel supplements. For example, the applicable hydrogen fuel for a fuel cell charger required by a 2W mobile phone should maintain a stable rate of hydrogen release of about 24 ml/min.

According to an embodiment of the invention, a plastic solid-state hydrogen fuel cell includes at least one fuel supply unit. Each fuel supply unit is composed by the polymer matrix, catalyst and solid-state chemical hydride. The fuel supply unit can also be formed into various geometric and/or other shapes and structures and can provide a steady rate of hydrogen release.

In one embodiment, a solid-state hydrogen fuel with a polymer matrix, comprises: a polymer matrix; and a crushed mixture of a solid-state chemical hydride and a solid-state catalyst uniformly dispersed in the polymer matrix. The polymer matrix includes a hydrophobic polymeric elastomer. In one specific example, the hydrophobic polymeric elastomer comprises silicone, rubber or silicone rubber. Since the silicone rubber has hydrophobic surface properties, the silicone rubber does not stick to a variety of materials and therefore can serve as anti-stick isolation structures. Furthermore, the silicone rubber has excellent hest-resistant properties such that it can endure long-term operating conditions of temperatures under 260° C. and a short-term operating conditions of temperatures under 300° C. The silicone rubber also has excellent low temperature properties with glass transition temperature of $(-123\pm5)°$ C. The working temperature is approximately between $-100°$ C. and 260° C. Moreover, the silicone rubber is one of the most gas-permeable elastomers, with a gas penetration rate 25 times greater than that of natural rubber and 428 times greater than that of butyl rubber. In addition, the silicone rubber has non-toxic properties and has high affinity to the environment.

The solid-state chemical hydride comprises an alkali metal containing hydrogen boride, an alkali metal hydride, a metal hydrogen boride and a metal hydride. The content of the solid-state chemical hydride is in a range of about 30% to about 70%. In another embodiment, the solid-state chemical hydride comprises $NaBH_4$ (NBH), NaH, $LiBH_4$, LiH, $CaH_2$, $Ca(BH_4)_2$, $MgBH_4$, $KBH_4$, and $Al(BH_4)_3$. Alternatively, the solid-state chemical hydride comprises $B_xN_yH_z$ compounds, wherein the compounds with the $B_xN_yH_z$ empirical formula comprise $H_3BNH_3$, $H_2B(NH_3)_2BH_4$, polyamine borane, $B_3N_3H_6$, borane-tetrahydrofuran complex, and ethylborane $(B_2H_6)$.

The solid-state catalyst comprises solid-state acids, ruthenium, cobalt, nickel, copper, and iron containing metal salts or solid-state catalysts made of the aforementioned metal ions. The content of the solid-state catalyst is in a range of about 0% to about 25%.

Note that the preparation method for the above-mentioned solid-state catalyst is a simple, rapid and low manufacturing cost process, and a fabrication flowchart is shown in FIG. 1. In this embodiment, a strong acid type ion exchange resin is selected to serve as a supporting body. Metal ions are chelated onto the resin surface by ion-exchange reaction between the ion exchange resin and metal ions, therefore directly drying to form a solid-state catalyst. For example, chelated metal (e.g., Ru, Co, Ni, Cu, Fe) salt solutions are provided (step S110). A predetermined amount of a strong acid type cation exchange resin is added in the metal salt solution (step S120). Subsequently, the metal salt solution is slowly stirred with a stirring speed of 50 rpm for 30 minutes at room temperature (step S130). The resin is taken out, and the surface thereof is rinsed with deionized water (step S140). The resin is then dried under a temperature of 120° C. (step S150) to complete preparation of the solid-state catalyst.

According to another embodiment of the invention, a fabrication method for a solid-state hydrogen fuel with a polymer matrix includes crushing and mixing a solid chemical compound of hydride (such as $NaBH_4$, step S210) and a solid-state catalyst (such as $Co^{2+}$/IR-120, step S220) in a crushing/mixing machine (such as high energy ball miller, step S230); and adding hydrophobic polymer elastic matrix (step S240) into the mixture of the solid chemical hydride and the solid-state catalyst to process a flexible solid-state hydrogen fuel (step S250). Furthermore, the flexible solid-state hydrogen fuel can be formed into various geometric and/or other shapes and be placed into suitable vessels. After the flexible solid-state hydrogen fuel reacts with the particular liquid, a steady rate of hydrogen release is provided.

Figure 2:
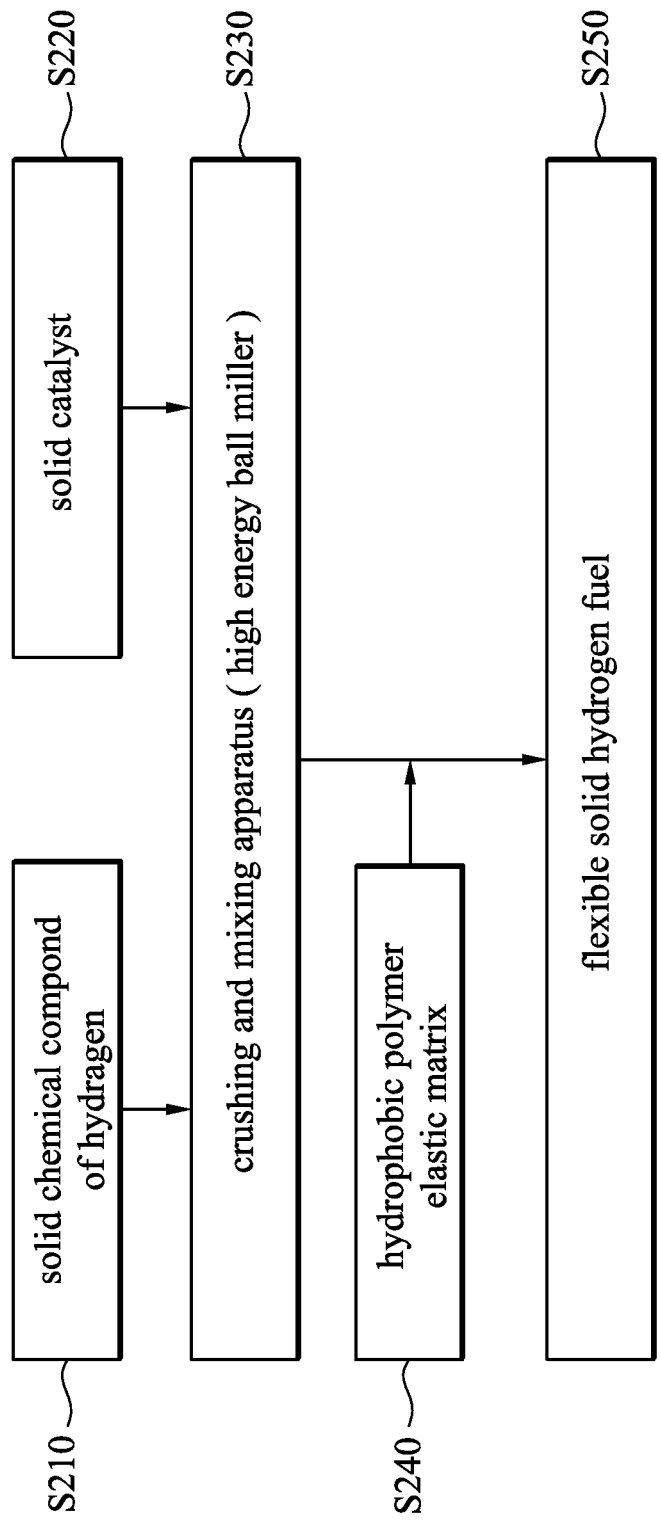
FIG. 2 is a fabrication flowchart of an embodiment of fabrication method for a flexible solid-state hydrogen fuel of the invention.

FIG. 2 is a fabrication flowchart of an embodiment of fabrication method for a flexible solid-state hydrogen fuel of the invention. First, a solid chemical hydride and the above-mentioned solid catalyst are ball-milled. During ball-milling, not only can the solid-state chemical hydride and the solid-state catalyst be completely mixed, but they can also be crushed and miniaturized. After ball milling, an appropriate amount of polymer matrix is added and further mixed in. The mixture is taken out after ball milling is completed again. The mixture of solid-state hydrogen fuel has flexible properties, and can be freely formed into various geometric and/or other shapes and structures. The flexible solid-state hydrogen fuel thus formed can be directly put into and react with a specific liquid, thereby providing a steady rate of hydrogen release. The specific liquid comprises water or an aqueous solution.

The crushing/mixing machine includes a jaw crusher, a gyratory crusher, a fine cone crusher, a rolls crusher, an impact crusher, a cutting crusher, a complex cutting crusher, a ball mill, a rod mill, and a vibration mill.

Figure 3:
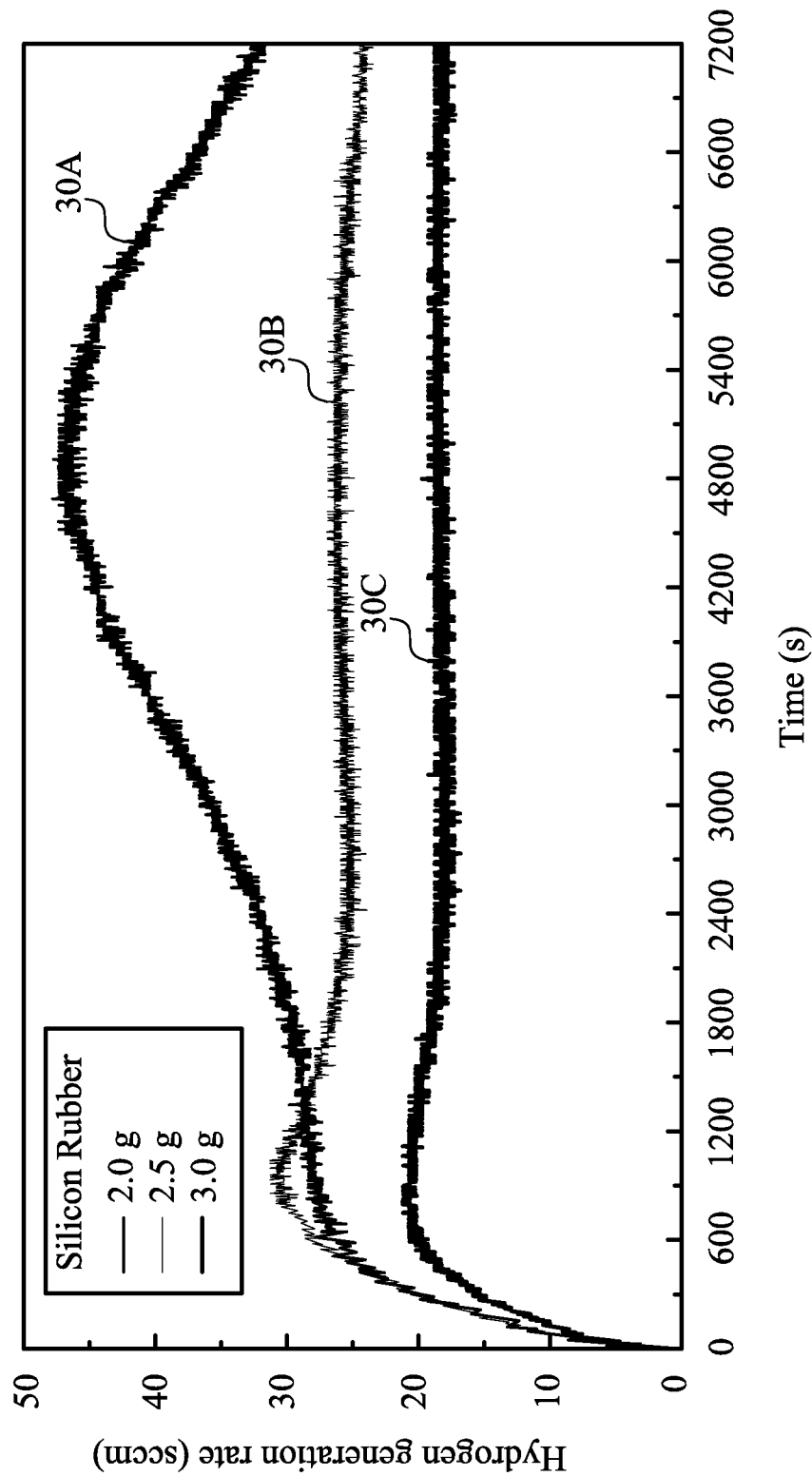
FIG. 3 is a schematic diagram showing the relationship between the addition of the polymer matrix and the corresponding rate of hydrogen release.
Figure 4:
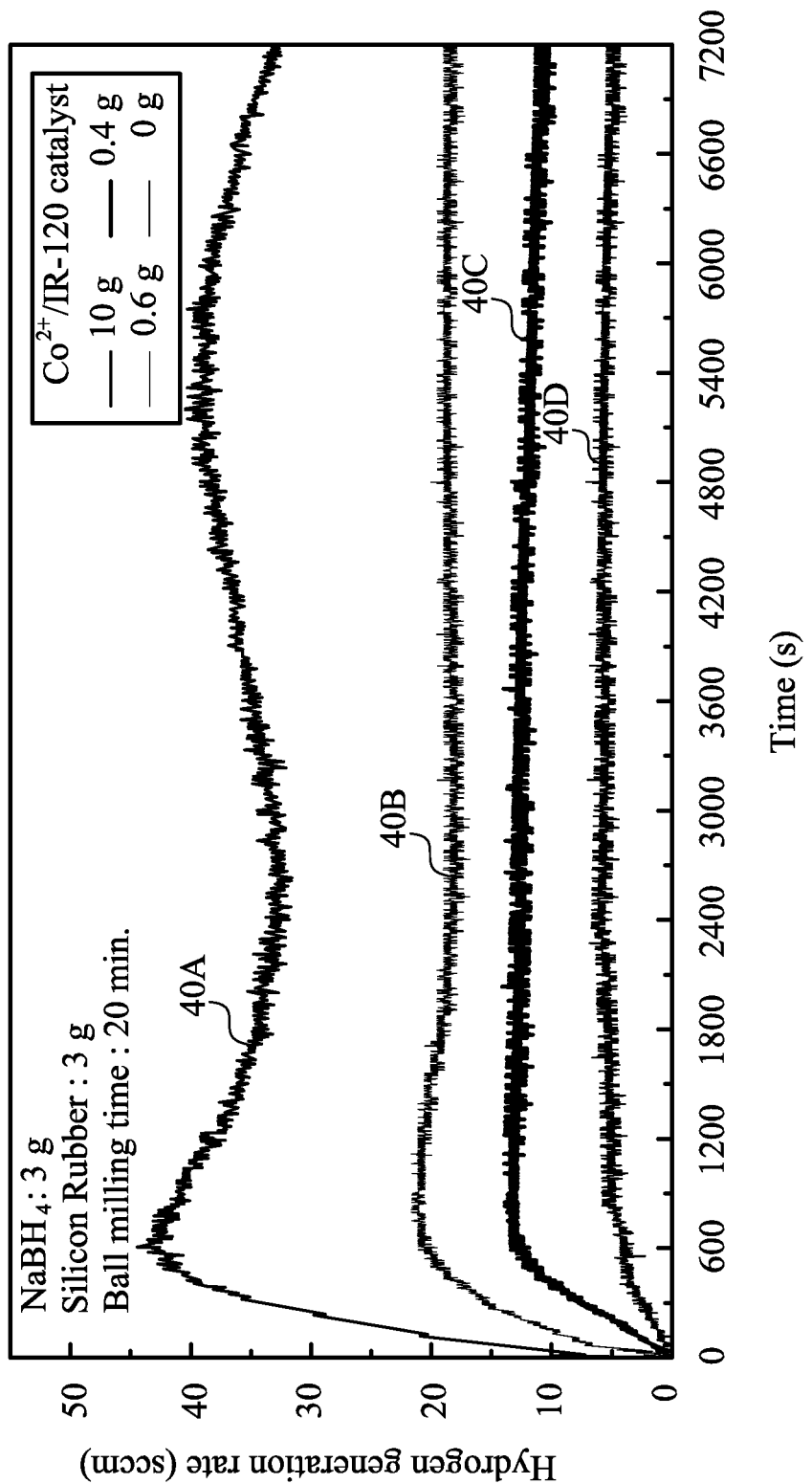
FIG. 4 is a schematic diagram showing the relationship between the addition of the catalyst and the corresponding rate of hydrogen release.
Figure 5:
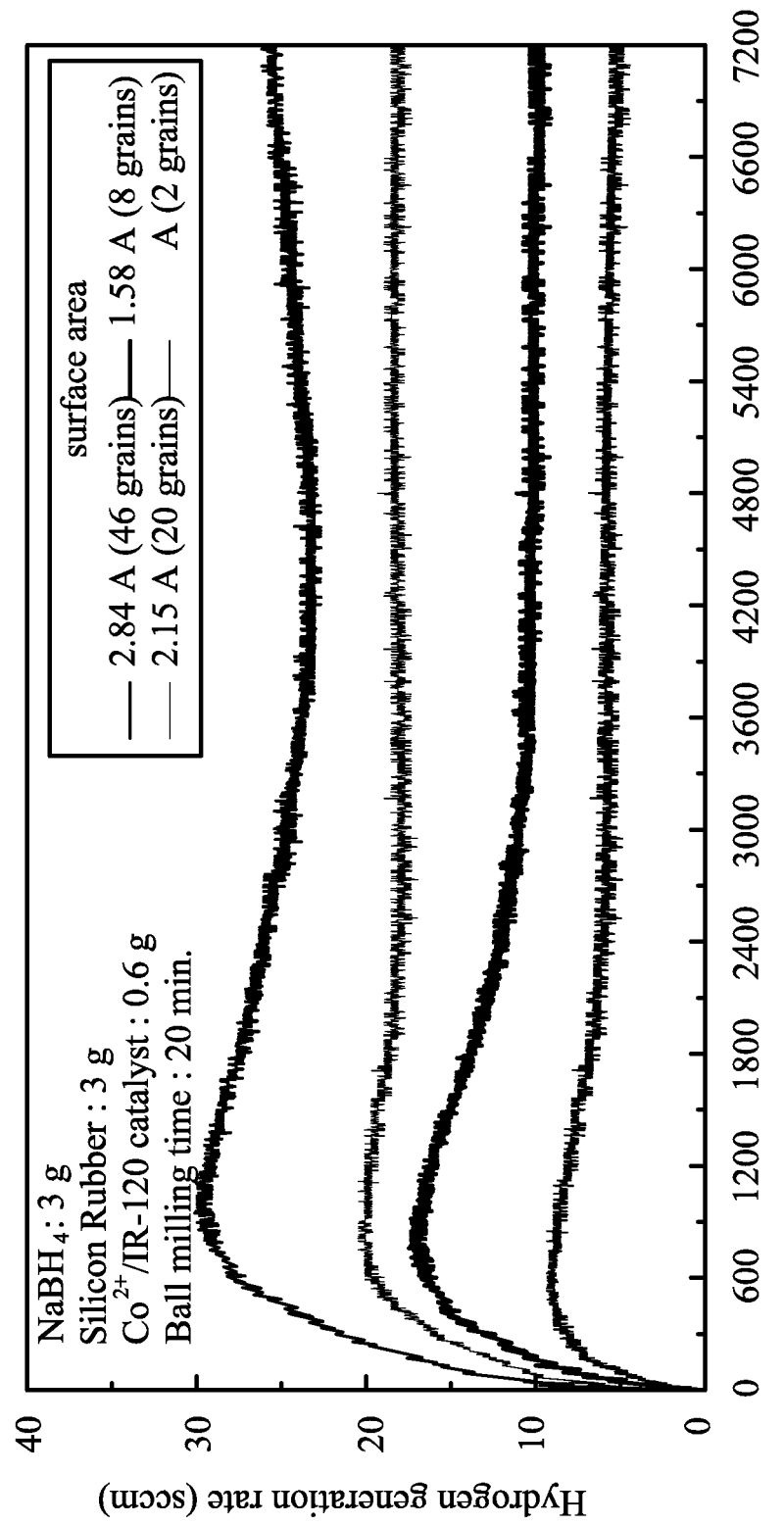
FIG. 5 is a schematic diagram showing the relationship between the surface area of the hydrogen fuel and the corresponding rate of hydrogen release.

In an exemplary embodiment, different rate of hydrogen releases can be controlled by regulating the amount of the polymer matrix added, and the relationship between the addition of the polymer matrix and the corresponding rate of hydrogen release is shown in FIG. 3. Moreover, different rate of hydrogen releases can be controlled by regulating the amount of catalyst added, and the relationship between the addition of the catalyst and the corresponding rate of hydrogen release is shown in FIG. 4. Furthermore, different rate of hydrogen releases can be controlled by regulating surface area of the hydrogen fuel, and the relationship between the surface area of the hydrogen fuel and the corresponding rate of hydrogen release is shown in FIG. 5. Accordingly, in an embodiment of the invention, different rate of hydrogen releases can be controlled by regulating the amount and particle sizes of the silicone rubber, and catalyst in the flexible solid-state hydrogen fuel.

In one comparable example, 3 grams of $NaBH_4$, 0.6 grams of $Co^{2+}$/IR-120, and 2.5 grams of silicone rubber are composed of a sample of the flexible solid-state hydrogen fuel, had a rate of hydrogen release stably maintained at 25 ml/min for more than two hours. The results were sufficient to meet the requirements for a fuel cell power charger of a 2W mobile phone.

Therefore, embodiments of the invention provide flexible solid-state hydrogen fuel which can be contained in plastic vessels. The flexible solid-state hydrogen fuel is advantageous in that it is inexpensive, small-sized, light weighted, and stably releases hydrogen. The flexible solid-state hydrogen fuel can be simply used by adding water. After the solid-state hydrogen fuel is depleted, consumers may choose to discard or to recycle the solid-state hydrogen fuel supplements.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded to the broadest interpretation so as to encompass all such modifications and similar arrangements.

What is claimed is:

1. A solid-state hydrogen fuel with a polymer matrix, comprising:
   a polymer matrix; and
   a crushed mixture of a solid-state chemical hydride and a solid-state catalyst uniformly dispersed in the polymer matrix, wherein the polymer matrix comprises a hydrophobic polymeric elastomer comprising silicone rubber, wherein the solid-state catalyst is metal ions chelated by ion-exchange resins, wherein the solid-state hydrogen fuel is activatable to a steady state reaction with liquid water.

2. The solid-state hydrogen fuel with a polymer matrix as claimed in claim 1, wherein the solid-state chemical hydride comprises an alkali metal containing hydrogen boride, an alkali metal hydride, a metal hydrogen boride or a metal hydride.

3. The solid-state hydrogen fuel with a polymer matrix as claimed in claim 1, wherein the solid-state chemical hydride comprises $NaBH_4$, $NaH$, $LiBH_4$, $LiH$, $CaH_2$, $Ca(BH_4)_2$, $MgBH_4$, $KBH_4$, or $Al(BH_4)_3$.

4. The solid-state hydrogen fuel with a polymer matrix as claimed in claim 1, wherein the solid-state chemical hydride comprises $H_3BNH_3$, $H_2B(NH_3)_2BH_4$, polyamine borane, $B_3N_3H_6$, borane-tetrahydrofuran complex, or ethylborane ($B_2H_6$).

5. The solid-state hydrogen fuel with a polymer matrix as claimed in claim 1, wherein a content of the solid-state chemical hydride is in a range of about 30% to about 70%.

6. The solid-state hydrogen fuel with a polymer matrix as claimed in claim 1, wherein solid-state catalyst comprises solid-state acids, ruthenium, cobalt, nickel, copper, or iron containing metal salts or solid-state catalysts made of the aforementioned metal ions.

7. The solid-state hydrogen fuel with a polymer matrix as claimed in claim 1, wherein a content of the solid-state catalyst is in a range of about 0% to about 25%, but not including 0%.

8. A fabrication method for a solid-state hydrogen fuel with a polymer matrix, comprising:
    crushing and mixing a solid chemical hydride and a solid-state catalyst in a crushing/mixing machine, wherein the solid-state catalyst is metal ions chelated by ion-exchange resins; and
    adding the polymer matrix into the mixture of the solid chemical hydride and the solid-state catalyst to process a flexible solid-state hydrogen fuel, wherein the polymer matrix comprises a hydrophobic polymeric elastomer comprising silicone rubber, wherein the solid-state hydrogen fuel is activatable to a steady state reaction with liquid water.

9. The fabrication method as claimed in claim 8, further comprising:
    forming various geometric and/or other shapes and placing the hydrogen fuel into a suitable vessel; and
    disposing a specific liquid in the suitable vessel to react with the solid-state hydrogen fuel, thereby providing a steady rate of hydrogen release.

10. The fabrication method as claimed in claim 8, wherein the solid-state chemical hydride comprises an alkali metal containing hydrogen boride, an alkali metal hydride, a metal hydrogen boride or a metal hydride.

11. The fabrication method as claimed in claim 8, wherein a content of the solid-state chemical hydride is in a range of about 30% to about 70%.

12. The fabrication method as claimed in claim 8, wherein the solid-state catalyst comprises solid-state acids, containing metal salts or solid-state catalysts made of the aforementioned metal ions.

13. The fabrication method as claimed in claim 8, wherein a content of the solid-state catalyst is in a range of about 0% to about 25%, but not including 0%.

14. The fabrication method as claimed in claim 8, wherein the crushing/mixing machine comprises a jaw crusher, a gyratory crusher, a fine cone crusher, a rolls crusher, an impact crusher, a cutting crusher, a complex cutting crusher, a ball mill, a rod mill, or a vibration mill.

15. The fabrication method as claimed in claim 14, wherein the specific liquid comprises water or an aqueous solution.

16. The fabrication method as claimed in claim 8, wherein the solid-state chemical hydride comprises $NaBH_4$, $NaH$, $LiBH_4$, $LiH$, $CaH_2$, $Ca(BH_4)_2$, $MgBH_4$, $KBH_4$, or $Al(BH_4)_3$.

17. The fabrication method as claimed in claim 8, wherein the solid-state chemical hydride comprises $H_3BNH_3$, $H_2B(NH_3)_2BH_4$, polyamine borane, $B_3N_3H_6$, borane-tetrahydrofuran complex, or ethylborane ($B_2H_6$).

18. The fabrication method as claimed in claim 1, wherein the metal ions of the solid-state catalyst are $Co^{2+}$.

19. The fabrication method as claimed in claim 8, wherein the metal ions of the solid-state catalyst are $Co^{2+}$.

* * * * *